Figure 1:
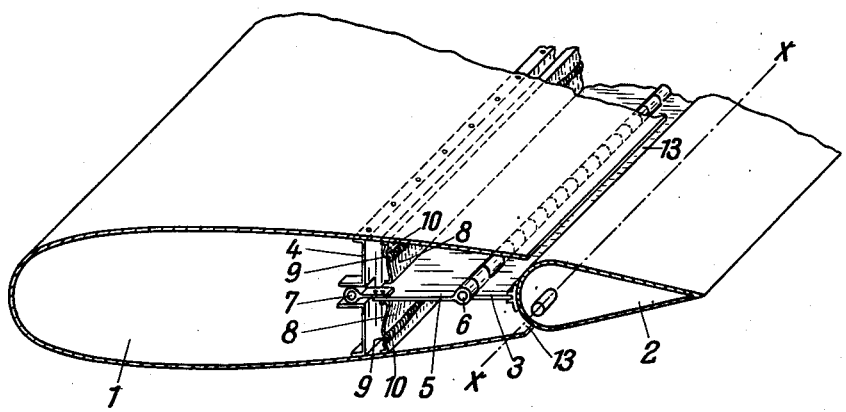

Inventors
Herbert Wagner &
Philipp von Doepp

Patented Aug. 20, 1940

2,211,870

UNITED STATES PATENT OFFICE 2,211,870

MEANS FOR BALANCING THE TORQUES ACTING ON CONTROL SURFACES

Herbert Wagner and Philipp von Doepp, Dessau, Germany, assignors to Junkers Flugzeug-und-Motorenwerke Aktiengesellschaft, Dessau, Germany Application February 22, 1938, Serial No. 191,842
In Germany March 1, 1937

11 Claims. (Cl. 244—90)

This invention relates to aerial and naval craft and has particular reference to the equalization of the torques produced by the forces of flow on control surfaces and the like connected with such craft. More particularly the invention pertains to balancing devices of the type comprising a rocking piston rigidly connected with the control surface or the like and arranged for operation in a chamber, which is provided in the rear portion of a fixed plane wing or dead wood located in front of the control surface.

As is well known to those skilled in the art, in devices of the kind aforesaid the rocking piston subdivides the chamber, in which it operates, into two separate compartments, each of which communicates with the open space adjacent to the exterior of the control surface and the fixed plane. Whenever the control surface is displaced from its center position, different pressures prevail in the open spaces located at both sides of the control surface and the fixed plane. Evidently, this pressure difference also acts on the rocking piston so as to produce a torque counteracting the torque which is generated on the control surface by the forces of flow whereby the forces required for adjusting the control surface from its center position and for maintaining it in its deflected position are correspondingly reduced.

In the prior art, balancing arrangements of the afore-noted type have been suggested wherein the chamber compartments separated by the rocking piston were mutually shut off in a pressure-tight manner, in that, upon any movement of the control surface, the front edge of the rocking piston moved, at as small a distance as possible, along the front wall of the chamber, the chamber having been so curved as to correspond, as closely as possible, to the circular arch defined by the front edge of the rocking piston during the movement thereof.

However, partly in view of difficulties encountered in production, partly in consideration of the unavoidable deformations of the fixed plane, wing or the like, occurring during operation, it has proven to be exceedingly difficult to maintain the slit located intermediate the front wall of the chamber and the front edge of the rocking piston sufficiently small to mutually shut off the two chamber compartments in a sufficiently pressure-tight manner. If, however, the slit causes a substantial leakage to occur intermediate the two compartments, the pressures prevailing in the two compartments are equalized to an extent such that only a small balancing torque is produced on the rocking piston.

The prior art arrangement, above referred to, involves the further drawback that for the purpose of a far-reaching balancing of torque the rocking piston is required to extend over a considerable distance in radial direction, whereas the customary form of the fixed plane or wing admits only a comparatively small rocking angle; consequently the displacement of the control surface is also limited to such small angle.

It is an object of the present invention to provide arrangements for balancing the torques produced by the forces of flow on control surfaces and the like, which, at all deflections of the control surface, prevent the equalization of the pressures prevailing in the two chamber compartments without necessitating a high accuracy of construction.

The invention further enables the two compartments to be shut-off from each other in a pressure-tight manner even in the case of deformations of the control surface or the fixed plane.

Other objects, and the manner in which the same are attained, will appear from the following description.

According to this invention the rocking piston is formed of two parts, one of which (the rear part) is rigidly connected with the control surface, while the other one (the front part) is connected, in a movable yet pressure-tight manner, with the rear part on the one hand, and with a partition on the other hand, which subdivides the hollow fixed plane, to which the control surface is hinged, into a front and a rear chamber. The line, along which the front part of the piston is hinged to the partition, is spaced from the free edge of the front part of the rocking piston by a distance approximately corresponding to the width of this front part in the direction of movement of the craft. Thus again the chamber is subdivided, by the two parts of the rocking piston, into two compartments, either of which communicates with the adjacent open space in a manner such that upon any displacement of the control surface from its center position the pressures prevailing in the two compartments will differ. This difference of pressure now acts on the two parts of the rocking piston, the force acting on the front parts being transmitted onto the rear part of the rocking piston so as to cooperate in balancing the forces of flow acting on the control surface. Provided the width of the front part of the piston is suitably selected, this arrangement permits of producing a balancing force which is adapted to the requirements of each individual case, without the range of deflection of the rudder suffering any objectionable reduction.

It is desirable that with growing deflection of the control surface, where the torque on this surface increases correspondingly, the balancing torque is increased also. It is however difficult to obtain such increase of the balancing torque under the conditions stated, owing to the fact that in the case of a strong deflection of the control surface the flow is liable to break away on that side of the fixed plane and the control surface which, when this surface is deflected, is acted upon by a lower pressure than the other side. This, however, also brings about a reduction of the low pressure prevailing on this side, which simultaneously acts on both parts of the rocking piston, so that the pressure difference prevailing between the two compartments and consequently also the balancing torque produced by a conventional rocking piston are similarly reduced.

In order to balance, as far as possible, the work of adjustment which, with increasing deflection of the control surface, is also increased, even within the range of larger deflection of the surface, the two parts of the rocking piston may be connected in such manner that the volume of that chamber compartment, which is placed under a higher pressure, increases, whenever the control surface is adjusted, increases, during the deflection of the control surface from its center position, to a larger extent than corresponds to an increase in volume proportional to the deflection of the rudder. In a preferred embodiment the front part of the rocking piston is hingedly connected with the partition and rockingly and displaceably connected with the rear part of the rocking piston, the free edge of this rear part being forked and embracing the cylindrical edge of the front part of the rocking piston.

In the drawings affixed to this specification and forming part thereof several embodiments of our invention are illustrated diagrammatically by way of example.

Figure 2:
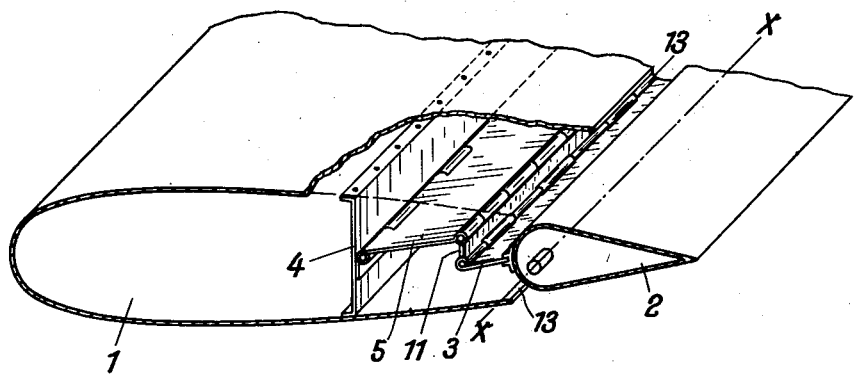
Figure 3:
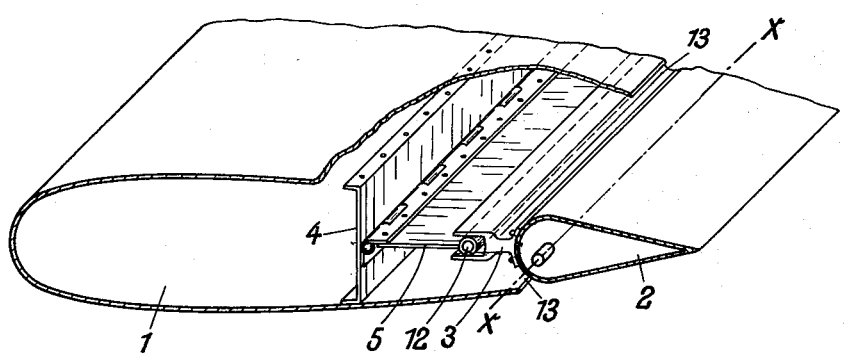
Figure 4:
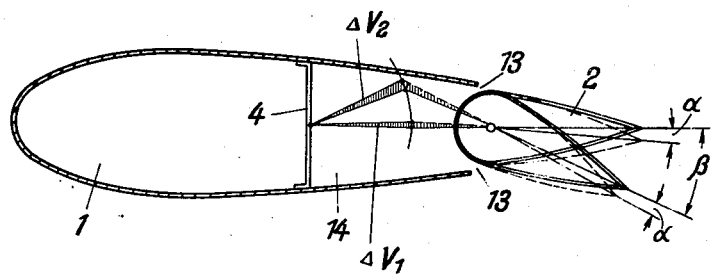

In the drawings:

Figs. 1, 2 and 3 are perspective views, partly in cross section, of several embodiments of the invention; while Fig. 4 is a diagram illustrating the functioning of the embodiment shown in Fig. 3.

Referring to the drawings, in all the figures 1 is a fixed plane and 2 is a control surface arranged in the rear of the fixed plane for rocking movement about an axis $x$—$x$. The rear portion of the fixed plane 1 contains a chamber formed by the top and bottom walls of the plane and by the partition 4. Into this chamber extends the rear part 3 of the rocking piston, which is rigidly connected with the control surface 2, while the front part 5 of the piston is movably connected with the rear part 3 as well as with the partition 4.

Referring more particularly to Fig. 1, the rear edge of the part 5 is connected with the part 3 by means of the hinge connection 6 along a line extending in parallel to the rocking axis $x$—$x$ of the rudder. From the front edge of the front part 5 there project rollers 7, which movably engage corresponding guides provided in the partition 4. Near the partition 4, both the top and bottom sides of the front part 5 of the piston have fixed to them strips of fabric 8, which are connected, by means of the zippers 9, with similar straps of fabric 10 provided on the top and the bottom walls as well as on the end walls of the chamber (not shown) in a manner such as to provide a pressure-tight closure. Thus the strips of fabric 8 and 10 form the front wall proper of the chamber.

Fig. 2 illustrates a modification of the invention, wherein the front part 5 of the piston is hinged to the partition 4. Between the two parts of the rocking piston an intermediate plane 11 is arranged, which is hinged to the rear edge of the part 5, and to the front edge of the rocking piston 3, on the other hand. In the center position of the control surface 2 the intermediate plane 11 extends at approximately right angles with respect to the plane connecting the front hinge of the auxiliary plane with the rocking axis of the control surface.

Fig. 3 shows a further modification of the invention, wherein the free end of the part 3, which is rigidly connected with the control surface, is forked, while the part 5 is hinged to the front wall 4 of the chamber and is formed, at its rear end, with a cylindrical portion 12, which engages the forked end of the rocking piston 3.

The parts 3 and 5, and in the embodiment according to Fig. 2 also the intermediate plane 11, subdivide the chamber in the rear portion of the fixed plane 1 into two compartments, which communicate, through the openings 13, with the outside spaces adjacent the exterior of the control surface and the fixed plane. Upon adjustment of the control surface from its center position, a higher pressure will be generated in one of the compartments than in the other and this excess pressure will then act on the rocking piston 3, 5 and the latter part will transmit the force exerted on it onto the former.

The afore-mentioned embodiments of the invention have in common the feature that an equalization of the pressure difference existing between the two compartments is avoided. Furthermore they enable comparatively large surfaces to be accommodated in the chamber which serve to create the balancing torque, although the rocking piston need possess only a comparatively small radial extension, so that the piston and consequently also the control surface though a far reaching equalization of torque is achieved, have an increased range of rocking motion.

On the control surface being adjusted, the volume of that compartment will be increased wherein, owing to such adjustment, the pressure is higher than in the other compartment. In the embodiment of Fig. 3, the increase in volume as the deflection of the control surface increases is more than proportionate to the deflection of the surface, as shown in the diagram of Fig. 4. If, for example, the control surface 2 is adjusted from its center position through the small angle $a$, the volume of the chamber compartment 14, which now obtains an excess pressure, increases by $\Delta V_1$. Upon a further deflection of the surface the increase in volume rises steadily. For example, if the control surface after having already been deflected from its center position through a large angle $\beta$, is adjusted, further through the angle $a$, then the volume of the compartment under excess pressure will rise by $\Delta V_2$. A comparison of the increases in volume $\Delta V_1$ and $\Delta V_2$, indicated by hatching in Fig. 4, shows that $\Delta V_2$ is considerably larger than $\Delta V_1$. Now since the energy required to adjust the control surface becomes larger in proportion as the angle of deflection increases, and since, on the other hand, the work performed by the difference of pressure existing between the two compartments and transmitted onto the rocking piston and the auxiliary plane, rises owing to such rising increase in volume, this arrangement results in an equalization of the work required for adjustment which is still very effective even when large deflections of the rudder are required.

We wish it to be understood that we do not desire to be limited to the exact details of construction shown and described for obvious modifications will occur to a person skilled in the art.

We claim:

1. Means for balancing torques acting on control surfaces in aerial and naval craft comprising in combination, a hollow fixed airfoil, a partition subdividing the interior of said airfoil into a front and a rear chamber, a control surface arranged for oscillation to the rear of said airfoil, a two part rocking piston having a first part fixed to said control surface and extending into said rear chamber, the other part of said piston being hinged to said partition and operatively connected with said first part, the two parts of said piston subdividing said rear chamber into two compartments, said control surface being located in spaced relation to said airfoil whereby the two compartments communicate with the air adjacent the airfoil.

2. The balancing means of claim 1, including guides in the partition for hingedly supporting the front part of the piston for longitudinal displacement and rocking motion relative to the partition.

3. The balancing means of claim 1, including means for connecting the two parts of the rocking piston with each other for rocking and for shifting movement.

4. The balancing means of claim 1, including means for connnecting the two parts of the rocking piston with each other for rocking and for shifting movement, the front edge of the rear part of the piston being forked and a cylinder on the rear edge of the front part of the piston engaging the forked part.

5. The balancing means of claim 1 in combination with strips of an elastic material connected, along their longitudinal edges, in a pressure-proof manner with the walls of the rear chamber and with the front part of the piston.

6. The balancing means of claim 1, including a strip of an elastic material fixed on each side of the front part of said piston, a similar strip on the adjoining chamber wall, and means for disengageably connecting the two strips.

7. The balancing means of claim 1, including a strip of an elastic material fixed on each side of the front part of the piston, a similar strip on the adjoining chamber wall, and zipper means for disengageably connecting the two strips.

8. The balancing means of claim 1 in combination with an intermediate member inserted between and hingedly connected with adjoining edges of the two parts of the rocking piston.

9. The balancing means of claim 1 in combination with an intermediate member inserted between and hingedly connected with the two parts of the rocking piston, the said intermediate member extending in a plane approximately at right angles to the plane containing the hinge axis between the two parts of the piston.

10. An airfoil, a control surface angularly movable relative to the airfoil, said airfoil having a substantially enclosed space therewithin, the leading edge portion of said control surface extending forwardly into said space dividing it into two chambers to provide an aerodynamic balance for the control surface substantially enclosed within the airfoil, there being passages in communication with said chambers within the airfoil at opposite sides of said aerodynamic balance opening rearwardly to the exterior of the airfoil at opposite sides thereof, respectively.

11. An airfoil, a control surface forming a trailing portion of said airfoil and angularly movable relative thereto, said airfoil having a space therewithin opening through the trailing portion thereof, said control surface mounted adjacent and substantially closing the trailing portion of said space, means mounted on the leading edge portion of the control surface and extended forwardly into said airfoil space and substantially enclosed therein to form an aerodynamic balance, the opposite sides of the control surface being spaced from the adjacent portions of the airfoil to form slots placing the spaces within the airfoil at opposite sides of said aerodynamic balance means in communication with the exterior of the airfoil at opposite sides thereof, respectively.

HERBERT WAGNER.
PHILIPP V. DOEPP.